United States Patent
Wang

(10) Patent No.: US 9,075,578 B2
(45) Date of Patent: Jul. 7, 2015

(54) TRANSMISSION PORT MODULE FOR EXPANDING TRANSMISSION CAPACITY OF A HOST MODULE AND COMPUTER SYSTEM THEREWITH

(71) Applicant: Aopen Inc., New Taipei (TW)

(72) Inventor: Jo-Chiao Wang, New Taipei (TW)

(73) Assignee: Aopen Inc., Xizhi Dist., New Taipei (TW)

( * ) Notice: Subject to any disclaimer, the term of this patent is extended or adjusted under 35 U.S.C. 154(b) by 142 days.

(21) Appl. No.: 13/947,115

(22) Filed: Jul. 22, 2013

(65) Prior Publication Data

US 2014/0104769 A1    Apr. 17, 2014

(30) Foreign Application Priority Data

Oct. 15, 2012 (TW) .............................. 101137922 A

(51) Int. Cl.
*H05K 5/00*  (2006.01)
*G06F 1/18*  (2006.01)

(52) U.S. Cl.
CPC ...................................... *G06F 1/181* (2013.01)

(58) Field of Classification Search
CPC .......... H05K 5/00; G06K 1/16; G06K 1/1632
USPC ...................................................... 361/679.4
See application file for complete search history.

(56) References Cited

U.S. PATENT DOCUMENTS

| 5,581,127 | A | * | 12/1996 | Shinohara | 257/679 |
| 5,734,860 | A | * | 3/1998 | Kondo | 711/115 |
| 2009/0043936 | A1 | * | 2/2009 | Yang et al. | 710/304 |
| 2009/0113102 | A1 | * | 4/2009 | Wang | 710/300 |

FOREIGN PATENT DOCUMENTS

TW    M331273    4/2008

OTHER PUBLICATIONS

Office action mailed on Aug. 29, 2014 for the Taiwan application No. 101137922, filing date: Oct. 15, 2012, p. 1 line 14, p. 2, p. 3 line 1-18 and line 22-26, p. 4-5 and p. 6 line 1-22.

* cited by examiner

*Primary Examiner* — Forrest M Phillips
(74) *Attorney, Agent, or Firm* — Winston Hsu; Scott Margo

(57) ABSTRACT

A transmission port module for expanding transmission capacity of a host module is disclosed. The host module includes a host casing and a host circuit board installed inside the host casing. The transmission port module includes a base casing, a transmission circuit board, at least one transmission port and an integrated connector. The base casing is installed onto the host casing in a detachable manner. The transmission circuit board is installed inside the base casing. The at least one transmission port is electrically connected to the transmission circuit board, and the integrated connector is electrically connected to the transmission circuit board. The integrated connector is electrically connected to the host circuit board when the base casing is installed onto the host casing, so as to establish connection between the host circuit board and the at least one transmission port.

12 Claims, 5 Drawing Sheets

TRANSMISSION PORT MODULE FOR EXPANDING TRANSMISSION CAPACITY OF A HOST MODULE AND COMPUTER SYSTEM THEREWITH

BACKGROUND OF THE INVENTION

1. Field of the Invention

The present invention relates to a transmission port module and a computer system, and more particularly, to a transmission port module for expanding transmission capacity of a host module and a computer system therewith.

2. Description of the Prior Art

Generally speaking, a computer system is equipped with a transmission port module for receiving signals transmitted from an external electronic device and/or for transmitting signals generated from the computer system to the external electronic device. Accordingly, the computer system and the external electronic device can establish connection therebetween, so as to transmit and/or receive data. Nowadays, the computer system has a trend toward lighter, thinner, shorter, and smaller, but the conventional transmission module is fixed on the computer system and occupies a specific volume. As a result, in the conventional transmission module lacks expanding capacity and disadvantages the trend of the computer system toward miniaturization.

SUMMARY OF THE INVENTION

Thus, the present invention provides a transmission port module for expanding transmission capacity of a host module and a computer system therewith for solving above drawbacks.

According to an embodiment of the present invention, a transmission port module for expanding transmission capacity of a host module is disclosed. The host module includes a host casing and a host circuit board installed inside the host casing, and the transmission port module includes a base casing, a transmission circuit board, at least one transmission port and an integrated connector. The base casing is installed onto the host casing in a detachable manner. The transmission circuit board is installed inside the base casing. The at least one transmission port is electrically connected to the transmission circuit board. The integrated connector is electrically connected to the transmission circuit board, and the integrated connector is electrically connected to the host circuit board when the base casing is installed onto the host casing, so as to establish connection between the host circuit board and the at least one transmission port.

According to another embodiment of the present invention, the transmission port module further includes a cover casing whereon at least one assembly hole is formed. The cover casing is disposed on the base casing. The cover casing and the base casing cooperatively cover the transmission circuit board, the at least one transmission port and the integrated connector. The transmission port module further includes at least one assembly screw for screwing the cover casing onto the host casing via the at least one assembly hole.

According to another embodiment of the present invention, at least one assembly opening is formed on the base casing corresponding to the at least one assembly hole, and the at least one assembly opening is for allowing a screwing member to pass through, so that the screwing member screws the at least one assembly screw onto the host casing.

According to another embodiment of the present invention, the at least one transmission port may comprise a power supply port, a Universal Serial Bus port, an audio jack, a Mini Universal Serial Bus port, a High Definition Multimedia Interface, an Ethernet port or a combination thereof.

According to another embodiment of the present invention, a computer system includes a host module. The host module includes a host casing and a host circuit board installed inside the host casing. The computer system further includes a transmission port module. The transmission port module includes a base casing, a transmission circuit board, at least one transmission port and an integrated connector. The base casing is installed onto the host casing in a detachable manner. The transmission circuit board is installed inside the base casing. The at least one transmission port is electrically connected to the transmission circuit board. The integrated connector is electrically connected to the transmission circuit board, and the integrated connector is electrically connected to the host circuit board when the base casing is installed onto the host casing, so as to establish connection between the host circuit board and the at least one transmission port.

According to another embodiment of the present invention, the host module further includes a first fixing frame disposed on a side of the host casing, and the first fixing frame is for fixing the side of the host casing.

According to another embodiment of the present invention, the host module further includes a second fixing frame disposed on another side of the host casing, and the second fixing frame is for fixing the another side of the host casing.

According to another embodiment of the present invention, the host module further includes a host cover and a data storage device. The host cover is disposed on the host casing. The host cover and the base casing cooperatively cover the host circuit board. The data storage device is installed on the host cover in a slidable manner.

According to another embodiment of the present invention, the host cover includes a sliding structure, and the host module further includes a sliding frame installed on the data storage device. The sliding frame is for cooperating with the sliding structure to make the data storage device slide relative to the host cover.

In summary, the computer system of the present invention adopts that the transmission port module is detachable from the host module. When the transmission port module is used for expanding the transmission capacity of the host module, the assembly screws are used for fixing the transmission port module on the host module, so as to expand the transmission capacity of the host module by utilizing the transmission ports of the transmission port module. When the transmission port module is not required for expanding the capacity of the host module, the assembly screws are detached from the host module for further detaching the transmission port module from the host module. As mentioned above, the constrain of the host module by the volume of the transmission port module can be avoid due to detachability design, and thus it can facilitate a trend of the computer system toward miniaturization. In addition, the transmission ports of the transmission port module can be implemented according to the practical demands of product. Accordingly, it can enhance the application flexibility of the host module of the computer system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
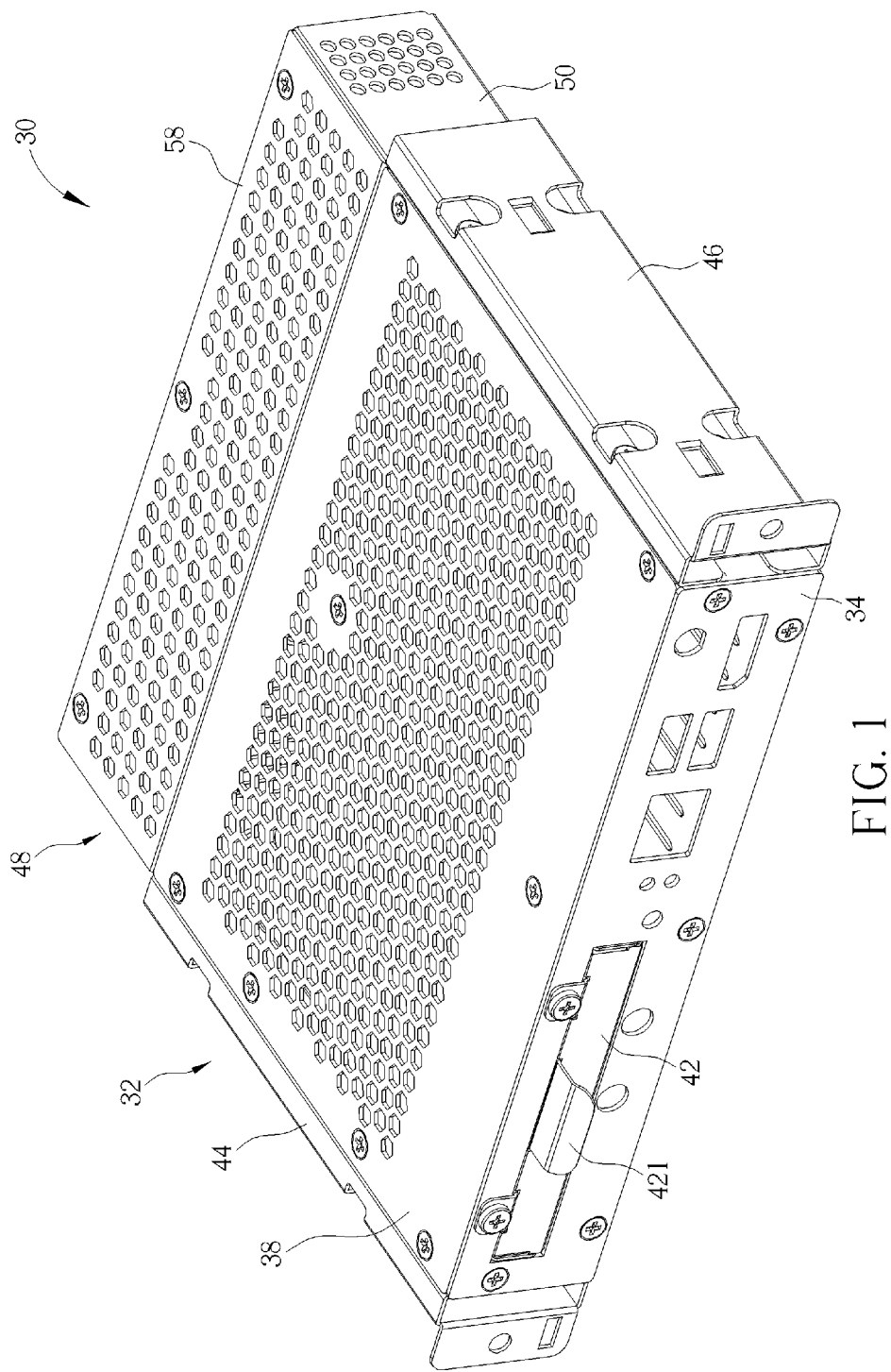
FIG. 1 is a schematic diagram of a computer system according to an embodiment of the present invention.
Figure 2:
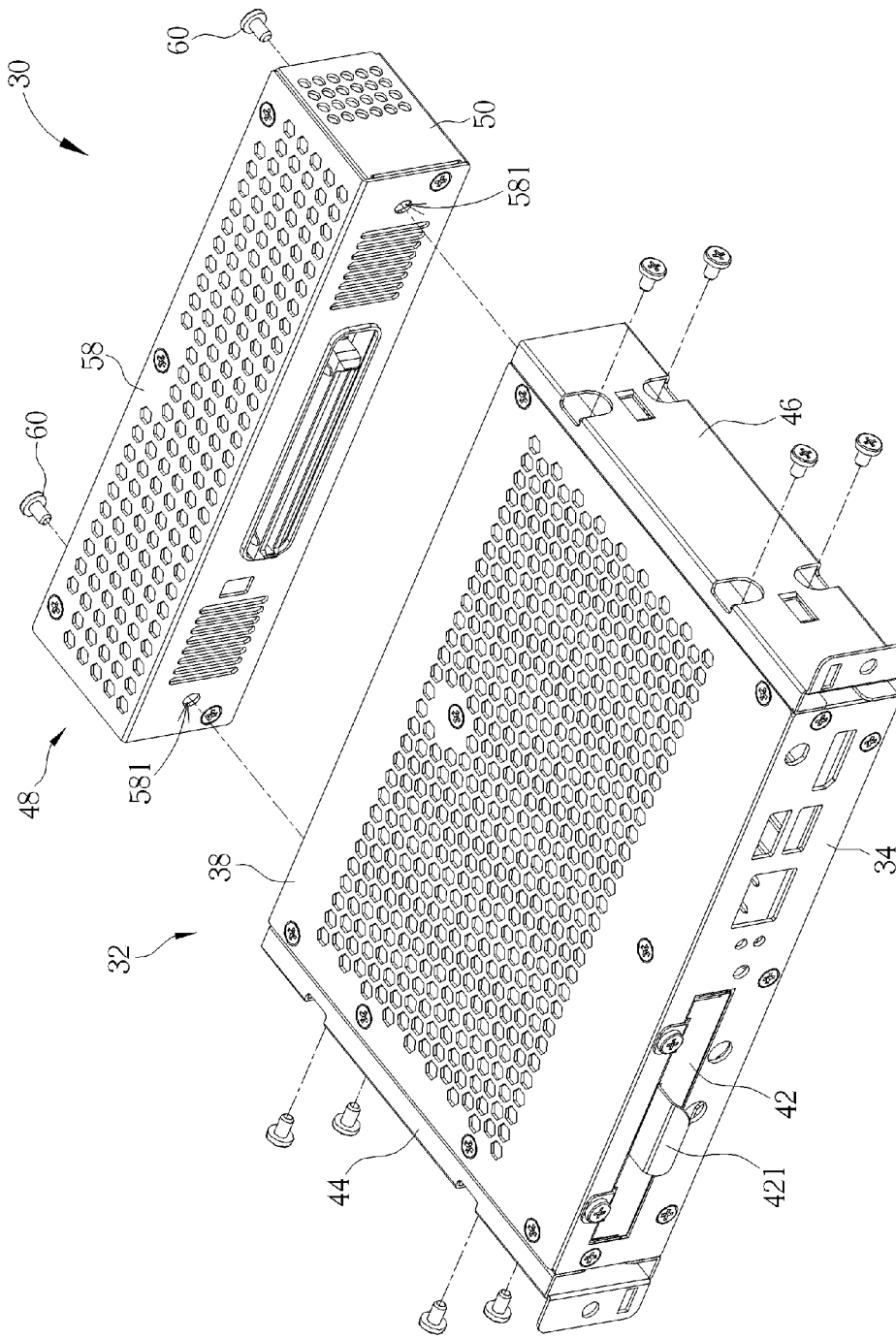
FIG. 2 is an exploded diagram of the computer system according to the embodiment of the present invention.
Figure 3:
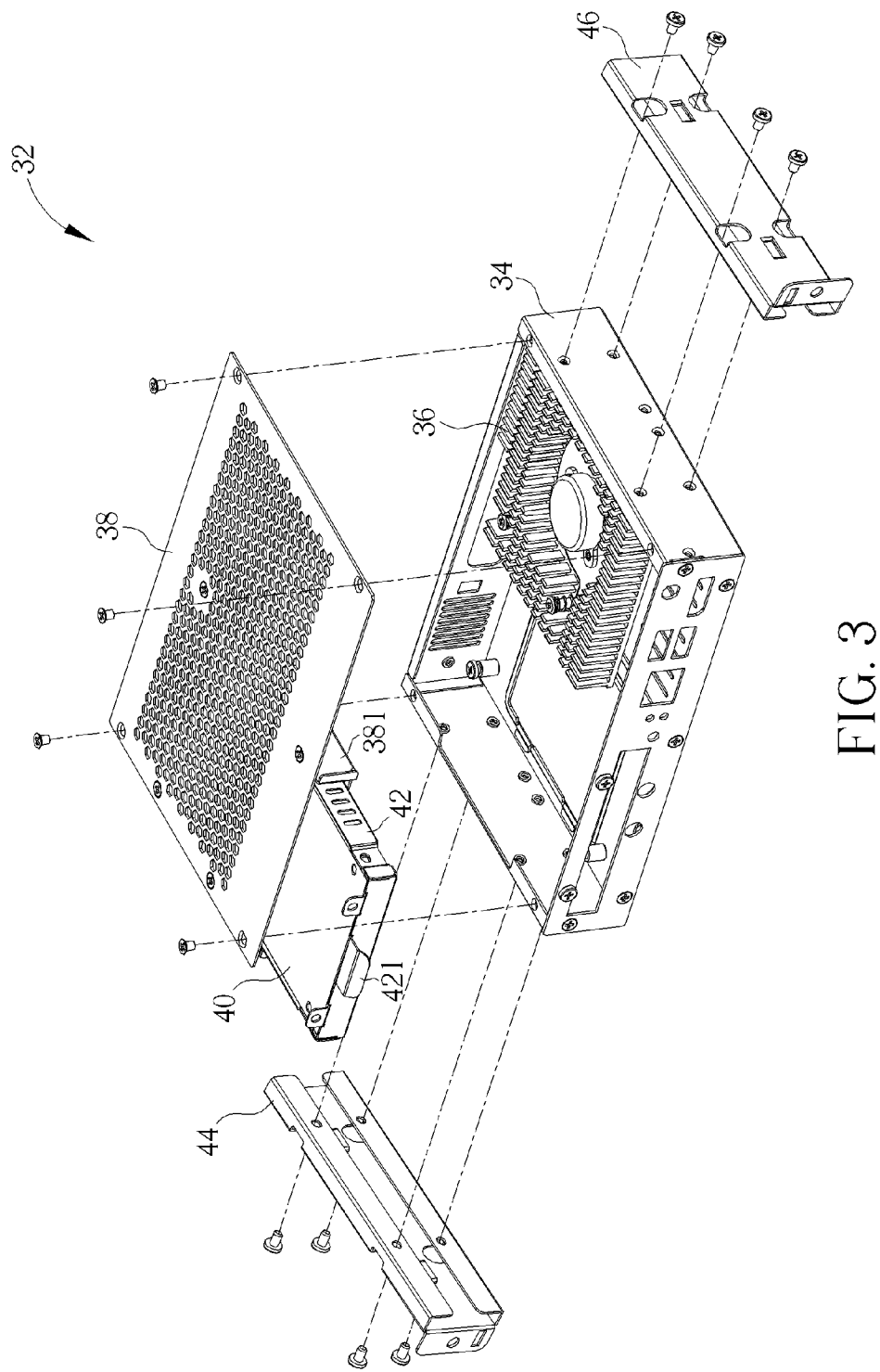
FIG. 3 is an exploded diagram of a host module according to the embodiment of the present invention.

Please refer to FIG. 1 and FIG. 2. FIG. 1 is a schematic diagram of a computer system 30 according to an embodiment of the present invention. FIG. 2 is an exploded diagram of the computer system 30 according to the embodiment of the present invention. As shown in FIG. 1 and FIG. 2, the computer system 30 includes a host module 32. In this embodiment, the host module 32 can be, but not limited to, a desktop computer or a server computer. Please refer to FIG. 1 to FIG. 3. FIG. 3 is an exploded diagram of the host module 32 according to the embodiment of the present invention. As shown in FIG. 1 to FIG. 3, the host module 32 includes a host casing 34 and a host circuit board 36, and the host circuit board 36 is installed inside the host casing 34.

As shown in FIG. 1 to FIG. 3, the host module 32 further includes a host cover 38 disposed on the host casing 34. The host cover 38 and the host casing 34 cooperatively cover the host circuit board 36 and other internal components of the computer system 30, such as a cable, a memory and so on, so as to prevent the host circuit board 36 and the other internal components of the computer system 30 from being damaged due to collision. In this embodiment, the host cover 38 is screwed on the host casing 34. The host module 32 further includes a data storage device 40 installed on the host casing 34 in a slidable manner. In this embodiment, the data storage device 40 can be, but not limited to, a hard disk drive or an optical disk drive.

Furthermore, the host cover 38 includes a sliding structure 381, and the host module 32 further includes a sliding frame 42. The sliding frame 42 is installed on the data storage device 40, and the sliding frame 42 is used for cooperating with the sliding structure 381 to make the data storage device 40 slide relative to the host cover 38. In this embodiment, the sliding structure 381 is a sliding slot, and the sliding frame 42 is a track frame. The track frame is slidably disposed inside the sliding slot. Structures of the sliding structure 381 and the sliding frame 42 of the present invention are not limited to those mentioned in this embodiment, e.g. the sliding structure 381 and the sliding frame 42 can be a roller and a slot frame, respectively.

When the data storage device 40 is to be installed, the sliding frame 42, i.e. the track frame, is installed on the data storage device 40 at first. Then, the sliding frame 42, i.e. the track frame, is pushed into an internal space formed between the host cover 38 and the host casing 34 along the sliding structure 381, i.e. the sliding slot, until the data storage device 40 is coupled to the host circuit board 36. In the meantime, it can establish connection between the host circuit board 36 and the data storage device 40, so as to perform data storage, data transmission and so on.

When the data storage device 40 is to be detached, the sliding frame 42, i.e. the track frame, is pulled out of the internal space formed between the host cover 38 and the host casing 34 along the sliding structure 381, i.e. the sliding slot, at first, so as to separate the data storage device 40 from the host circuit board 36, until the sliding frame 42 with the data storage device 40 are separated from the host cover 38. In the meantime, the data storage device 40 can be replaced. It should be noticed that a strap 421 can be disposed on the sliding frame 42. When the sliding frame 42 is desired to be pulled, the strap 421 can provide a place where force is applied for facilitating to pull the sliding frame 42. Practically, the sliding frame 42 is screwed on the data storage device 40.

As shown in FIG. 1 to FIG. 3, the host module 32 can further include a first fixing frame 44 and a second fixing frame 46. The first fixing frame 44 is disposed on a side of the host casing 34, and the first fixing frame 44 is used for bridging the side of the host casing 34 and an electronic system. The second fixing frame 46 is disposed on another side of the host casing 34, and the second fixing frame 46 is used for bridging the other side of the host casing 34 and the electronic system. Practically, since screw holes on the electronic system can be misaligned with screw holes on the host casing 34 of the computer system 30, the present invention utilizes the first fixing frame 44 and the second fixing frame 46 as a bridging mechanism for the host module 32 and the electronic system, such that the host module 32 can be combined with the electronic system by the first fixing frame 44 and the second fixing frame 46.

For example, a plurality of screw holes can be disposed on the first fixing frame 44, wherein a portion of the plurality of screw holes on the first fixing frame 44 corresponds to the screw holes on the electronic system, and the other portion of the plurality of screw holes on the first fixing frame 44 corresponds to the screw holes on the host casing 34. When the side of the host casing 34 is desired to be fixed on the electronic system, the portion of the plurality of screw holes on the first fixing frame 44 can be utilized for screwing the first fixing frame 44 on the host casing 34 of the host module 32 at first. Then, the other portion of the plurality of screw holes on the first fixing frame 44 can be utilized for screwing the host module 32 with the first fixing frame 44 on the electronic device. In such a manner, the side of the host module 32 can be fixed on the electronic system.

Similarly, a plurality of screw holes can be disposed on the second fixing frame 46, wherein a portion of the plurality of screw holes on the second fixing frame 46 corresponds to the screw holes on the electronic system, and the other portion of the plurality of screw holes on the first fixing frame 44 corresponds to the screw holes on the host casing 34. When the other side of the host casing 34 is desired to be fixed on the electronic system, the portion of the plurality of screw holes on the second fixing frame 46 can be utilized for screwing the second fixing frame 46 on the host casing 34 of the host module 32 at first. Then, the other portion of the plurality of screw holes on the second fixing frame 46 can be utilized for screwing the host module 32 with the second fixing frame 46 on the electronic device. In such a manner, the other side of the host module 32 can be fixed on the electronic system.

When the side of the host casing 34 is installed on a casing of the electronic system, screwing components, such as screws, can be utilized for screwing the plurality of screw holes on the first fixing frame 44, the screw holes on the casing of the electronic system and the screw holes on the host casing 34. Accordingly, the first fixing frame 44 can be used for bridging and fixing the side of the host casing 34 on the casing of the electronic system. When the other side of the host casing 34 is installed on the casing of the electronic system, screwing components, such as screws, can be utilized for screwing the plurality of screw holes on the second fixing frame 46, the screw holes on the casing of the electronic system and the screw holes on the host casing 34. Accordingly, the second fixing frame 46 can be used for bridging and fixing the other side of the host casing 34 on the casing of the electronic system. Practically, the electronic system is an electronic board system adapted to Open Pluggable Specification, OPS, such as a digital commercial device, a pluggable media player and so on.

Figure 4:
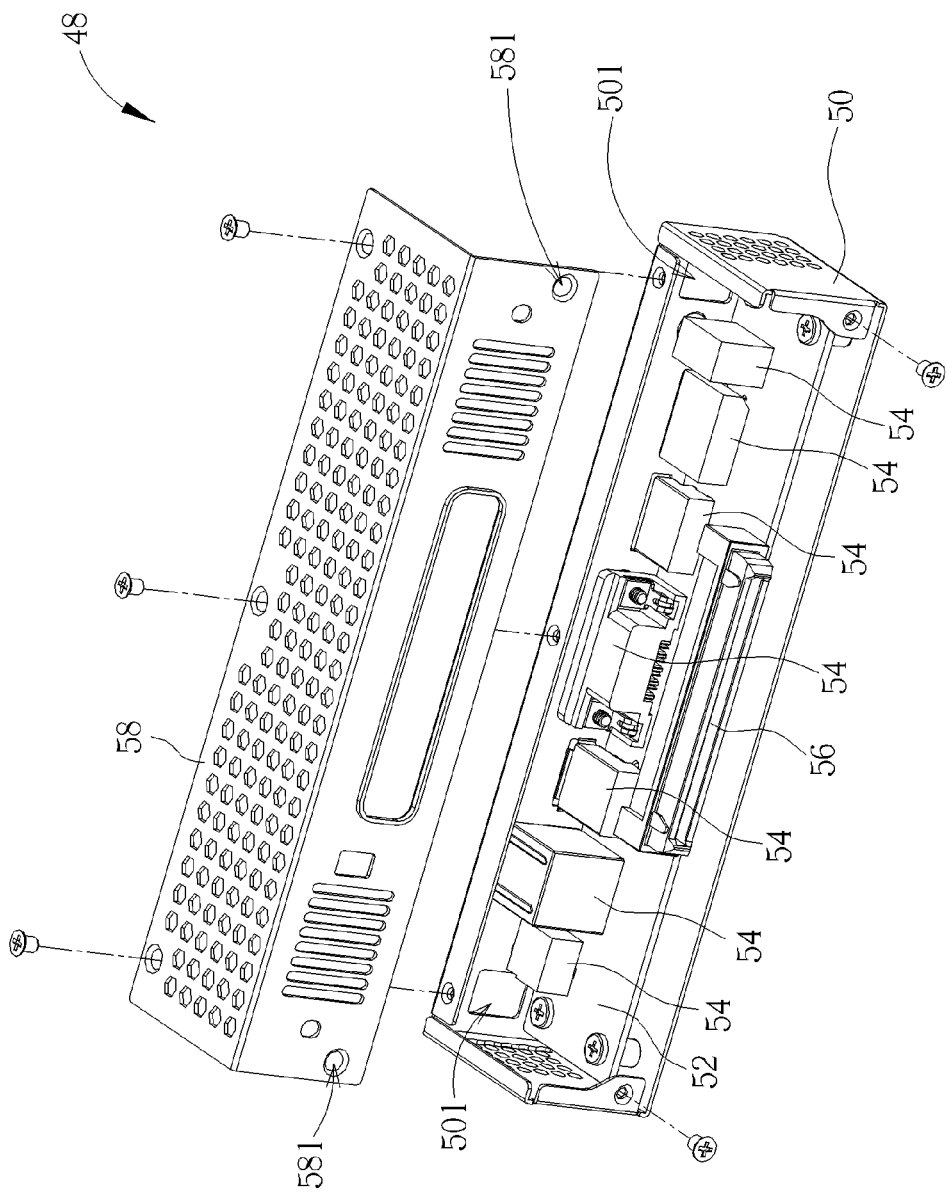
FIG. 4 is an exploded diagram of a transmission port module according to the embodiment of the present invention.

As shown in FIG. 1 and FIG. 2, the computer system 30 further includes a transmission port module 48 installed on the host casing 34 of the host module 32 in a detachable manner, and the transmission port module 48 is used for expanding transmission capacity of the host module 32. Please refer to FIG. 2 and FIG. 4. FIG. 4 is an exploded diagram of the transmission port module 48 according to the embodiment of the present invention. As shown in FIG. 1 and FIG. 4, the transmission port module 48 includes a base casing 50, a transmission circuit board 52, a plurality of transmission ports 54 an integrated connector 56 and a cover casing 58. The base casing 50 is installed on the host casing 34 of the host module 32 in a detachable manner. The transmission circuit board 52 is installed inside the base casing 50. The transmission ports 54 and the integrated connector 56 are respectively coupled to the transmission circuit board 52.

Furthermore, the cover casing 58 and the base casing 50 can cooperatively cover the transmission circuit board 52, the transmission ports 54 and the integrated connector 56, so as to prevent the transmission circuit board 52, the transmission ports 54 and the integrated connector 56 from being damaged due to collision. In this embodiment, the cover casing 58 can be, but not limited to, screwed or wedged on the base casing 50. In this embodiment, the cover casing 58 is a substantially L-shaped plate structure, and a substantially L-shaped opening corresponding to the L-shaped plate structure is formed on the base casing 50. The L-shaped plate structure can cover the L-shaped opening, so as to enclose the transmission circuit board 52, the transmission ports 54 and the integrated connector 56.

It should be noticed that structures of the cover casing 58 of the present invention are not limited to those mentioned in this embodiment. For example, the cover casing 58 can be a plate structure, and a planar opening corresponding to the plate structure is formed on the base casing 50. The plate structure can cover the planar opening, so as to enclose the transmission circuit board 52, the transmission ports 54 and the integrated connector 56.

In this embodiment, the transmission ports 54 are respectively a power supply port, a Universal Serial Bus port, USB, an audio jack, a Mini Universal Serial Bus port, Mini USB, a High Definition Multimedia Interface, HDMI, an Ethernet port or a combination thereof. An amount and category of the transmission ports 54 of the transmission port module 48 are not limited to those mentioned in this embodiment, and it depends on practical demands. In addition, the integrated connector 56 can be, but not limited to, a gold finger contact or a Board To Board connector, BTB connector.

Figure 5:
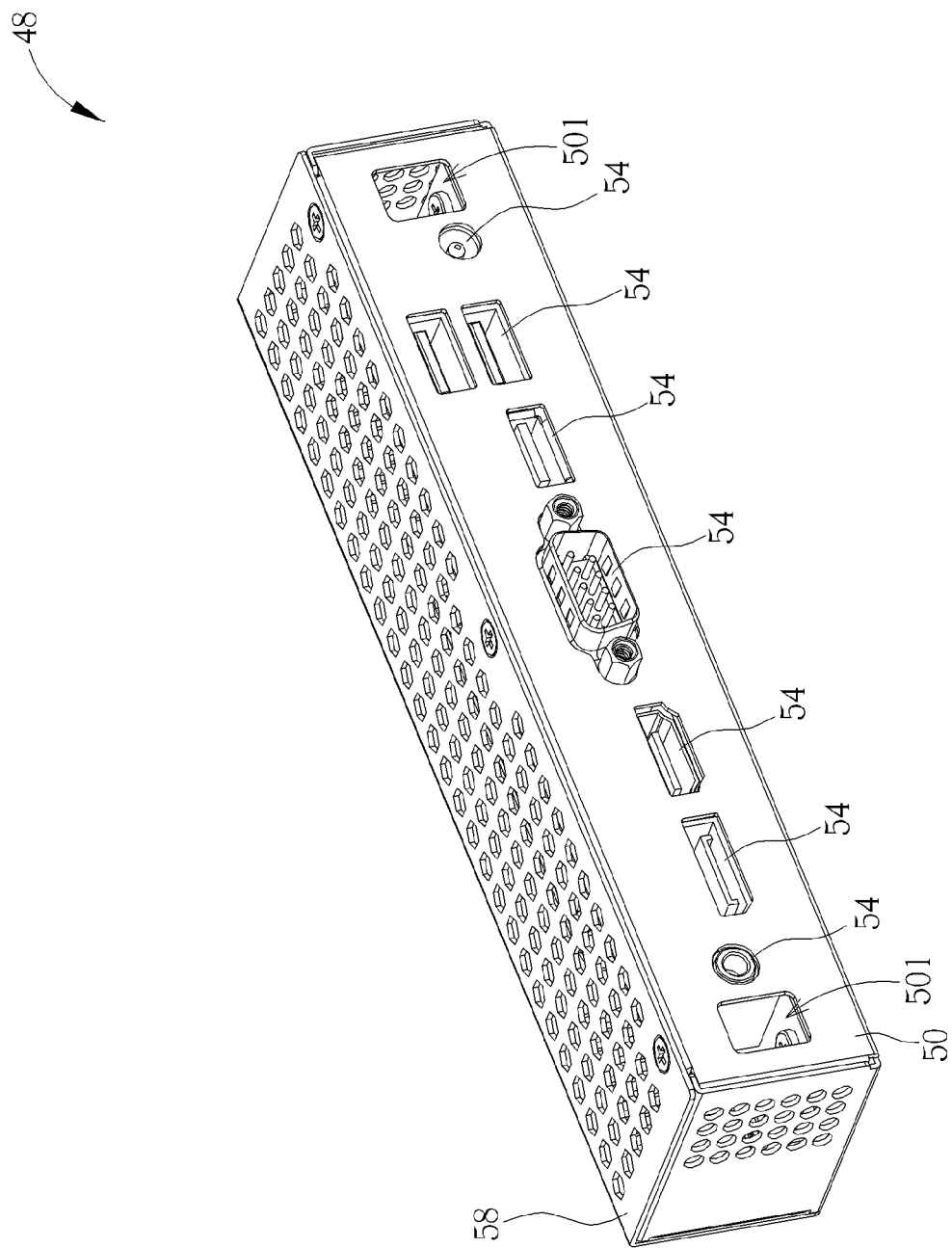
FIG. 5 is a diagram of the transmission port module in another view according to the embodiment of the present invention.

Please refer to FIG. 2, FIG. 4 and FIG. 5. FIG. 5 is a diagram of the transmission port module 48 in another view according to the embodiment of the present invention. As shown in FIG. 2, FIG. 4 and FIG. 5, two assembly holes 581 are formed on the cover casing 58 of the transmission port module 48, and the transmission port module 48 further includes two assembly screws 60. When the transmission port module 48 and the host module 32 are assembled, the assembly screws 60 can be used for screwing the cover casing 58 onto the host casing 34 via the assembly holes 581 on the cover casing 58. In such a manner, the transmission port module 48 can be fixed on the host module 32. When the transmission port module 48 and the host module 32 are detached, the assembly screws 60 can be detached from the host casing 34 via the assembly holes 581 on the cover casing 58. In such a manner, the transmission port module 48 can be separated from the host module 32.

In addition, two assembly openings 501 corresponding to the two assembly holes 581 are formed on the base casing 50. When the transmission port module 48 and the host module 32 are assembled, the assembly openings 501 can provide a channel for allowing a screwing member, such as a screw driver, to pass through. Accordingly, the screwing member can screw the assembly screws 60 onto the host casing 34 of the host module 32 via the assembly openings 501. Amounts and disposal positions of the assembly hole 581, the assembly screw 60 and the assembly opening 501 are not limited to those illustrated in figures. At least one assembly hole 581 can be formed on the cover casing 58. The transmission port module 48 can include at least one assembly screw 60. At least one assembly opening 501 is formed on the base casing 50.

When the base casing 50 of the transmission port module 48 is installed on the host casing 34 of the host module 32 by the cover casing 58 and the assembly screws 60, the integrated connector 56 of the transmission port module 48 can be coupled to the a connector, not shown in figures, on the host circuit board 36 of the host module 32. Furthermore, since the integrated connector 56 and the transmission ports 54 of the transmission port module 48 are all coupled to the transmission circuit board 52, the signals can be transmitted between the host circuit board 36 of the host module 32 and transmission ports 54 by the connector, the integrated connector 56 and the transmission circuit board 52. In such a manner, it can establish connection between the host module 32 and an external electronic system by the transmission port module 48, so as to perform data storage, data transmission and so on. Furthermore, since the transmission ports 54 of the transmission port module 48 can be a power supply port, a Universal Serial Bus port, an audio jack, a Mini Universal Serial Bus port, a High Definition Multimedia Interface, an Ethernet port or a combination thereof, the transmission ports 54 of the transmission port module 48 of the present invention can be implemented according to practical demands of products. For example, when the host module 32 of the computer system 30 requires more Universal Serial Bus ports, the transmission ports 54 of the transmission port module 48 can be equipped with more Universal Serial Bus ports. As a result, a user installs the transmission port module 48 with the more Universal Serial Bus ports on the host module 32 in an above-mentioned manner, so that the host module 32 is capable of satisfying specification of product, and thus it can enhance application flexibility of the host module 32 of the computer system 30.

Compared to the prior art, the computer system of the present invention adopts that the transmission port module is detachable from the host module. When the transmission port module is used for expanding the transmission capacity of the host module, the assembly screws are used for fixing the transmission port module on the host module, so as to expand the transmission capacity of the host module by utilizing the transmission ports of the transmission port module. When the transmission port module is not required for expanding the capacity of the host module, the assembly screws are detached from the host module for further detaching the transmission port module from the host module. As mentioned above, volume of the transmission port module can not constrain the host module due to detachability design, and thus it can facilitate a trend of the computer system toward miniaturization. In addition, the transmission ports of the transmission port module can be implemented according to the practical demands of product. Accordingly, it can enhance the application flexibility of the host module of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission port module for expanding transmission capacity of a host module, the host module comprising a host casing and a host circuit board installed inside the host casing, the transmission port module comprising:
   a base casing installed onto a side of the host casing in a detachable manner, the base casing being located out of the side of the host casing when the base casing is installed onto the host casing;
   a transmission circuit board installed inside the base casing;
   at least one transmission port electrically connected to the transmission circuit board; and
   an integrated connector electrically connected to the transmission circuit board, the integrated connector being electrically connected to the host circuit board when the base casing is installed onto the host casing, so as to establish connection between the host circuit board and the at least one transmission port.

2. The transmission port module of claim 1, further comprising:
   a cover casing whereon at least one assembly hole is formed, the cover casing being disposed on the base casing, the cover casing and the base casing cooperatively covering the transmission circuit board, the at least one transmission port and the integrated connector; and
   at least one assembly screw for screwing the cover casing onto the host casing via the at least one assembly hole.

3. The transmission port module of claim 2, wherein at least one assembly opening is formed on the base casing corresponding to the at least one assembly hole, the at least one assembly opening being for allowing a screwing member to pass through, so that the screwing member screws the at least one assembly screw onto the host casing.

4. The transmission port module of claim 1, wherein the at least one transmission port is a power supply port, a Universal Serial Bus port, an audio jack, a Mini Universal Serial Bus port, a High Definition Multimedia Interface, an Ethernet port or a combination thereof.

5. A computer system, comprising:
   a host module, comprising:
      a host casing; and
      a host circuit board installed inside the host casing; and
   a transmission port module, comprising:
      a base casing installed onto a side of the host casing in a detachable manner, the base casing being located out of the side of the host casing when the base casing is installed onto the host casing;
      a transmission circuit board installed inside the base casing;
      at least one transmission port electrically connected to the transmission circuit board; and
      an integrated connector electrically connected to the transmission circuit board, the integrated connector being electrically connected to the host circuit board when the base casing is installed onto the host casing, so as to establish connection between the host circuit board and the at least one transmission port.

6. The computer system of claim 5, wherein the transmission port module further comprises:
   a cover casing whereon at least one assembly hole is formed, the cover casing being disposed on the base casing, the cover casing and the base casing cooperatively covering the transmission circuit board, the at least one transmission port and the integrated connector; and
   at least one assembly screw for screwing the cover casing onto the host casing via the at least one assembly hole.

7. The computer system of claim 6, wherein at least one assembly opening is formed on the base casing corresponding to the at least one assembly hole, the at least one assembly opening being for allowing a screwing member to pass through, so that the screwing member screws the at least one assembly screw onto the host casing.

8. The computer system of claim 5, wherein the at least one transmission port is a power supply port, a Universal Serial Bus port, an audio jack, a Mini Universal Serial Bus port, a High Definition Multimedia Interface, an Ethernet port or a combination thereof.

9. The computer system of claim 5, wherein the host module further comprises:
   a first fixing frame disposed on another side of the host casing, the first fixing frame being for fixing the side of the host casing.

10. The computer system of claim 9, wherein the host module further comprises:
    a second fixing frame disposed on another side of the host casing, the second fixing frame being for fixing the another side of the host casing.

11. The computer system of claim 5, wherein the host module further comprises:
    a host cover disposed on the host casing, the host cover and the base casing cooperatively covering the host circuit board; and
    a data storage device installed on the host cover in a slidable manner.

12. The computer system of claim 11, wherein the host cover comprises
    a sliding structure, and the host module further comprises:
    a sliding frame installed on the data storage device, the sliding frame being for cooperating with the sliding structure to make the data storage device slide relative to the host cover.

* * * * *